United States Patent [19]

Vella

[11] Patent Number: 4,935,259

[45] Date of Patent: Jun. 19, 1990

[54] SWEET AND SOUR GARLIC SAUCE

[76] Inventor: Salvatore Vella, 20 Julian Way, Marlboro, N.J. 07746

[21] Appl. No.: 298,990

[22] Filed: Jan. 19, 1989

[51] Int. Cl.⁵ .......................... A23L 1/226; A23L 1/27
[52] U.S. Cl. ...................................... 426/589; 426/650
[58] Field of Search ................ 426/589, 650, 250, 540

[56] References Cited

PUBLICATIONS

The Cooking of China, Time-Life Books, Time-Life Books, N.Y, 1968, p. 198.
Woman's Day Encyclopedia of Cookery, vol. 10, Fawcett Pub., Inc., N.Y., 1966, p. 1627.
Woman's Day Encyclopedia of Cookery, vol. 5, Fawcett Pub., Inc., N.Y., 1966, p. 825.
Chinese Food, L., Hippocrene Books, N.Y., 1972, pp. 36–37.
Lo, Chinese Vegetarian Cooking, Pantheon Books Random House, N.Y., 1974, p. 84.

*Primary Examiner*—Jeanette Hunter
*Attorney, Agent, or Firm*—Charles I. Brodsky

[57] ABSTRACT

A method for preparing sweet-and-sour sauce. The sweet-and-sour sauce combines a duck sauce with grenadine and granulated garlic, wherein the grenadine is stirred gently into the mixture at room temperature, while the granulated garlic is vigorously stirred in. The mixture is then allowed to settle for at least 24 hours at refrigerated temperature.

4 Claims, No Drawings

SWEET AND SOUR GARLIC SAUCE

FIELD OF THE INVENTION

This invention relates to the field of condiments, in general, and to a sweet-and-sour sauce for poultry and pork products, in particular.

SUMMARY OF THE INVENTION

As will become clear from the discussion that follows, the sweet-and-sour sauce of the invention includes a basics Duck Sauce combined with grenadine and granulated garlic, and stirred to insure that the resulting mix is completely dissolved, with the grenadine being easily stirred into the solution, and with the granulated garlic being stirred in hard. Experimentation has shown that the resultant taste afforded will be uniform throughout the mix if the ingredients so stirred are permitted to settle before use, and for a time approximating 24 hours. To prolong the taste of the mixture, experimentation has shown that refrigeration after use produces optimal results.

As will also become clear, the sweet-and-sour garlic sauce so described, according to a preferred embodiment of the invention, is mixed in a five gallon drum of a basic Duck Sauce, to which is added one liter of grenadine, and into which a quart of granulated garlic is stirred. In this embodiment, the grenadine is stirred easily into the Duck Sauce over a period of five minutes, and the granulated garlic then stirred hard into the Duck Sauce during a further period of 5-10 minutes. The resulting mix will then be seen to be permitted to settle for 24 hours before use.

Testing has shown that the resulting "red" color of the mixture produces significant eye appeal to the consumer, and the resulting "sweet and sour" taste is particularly desirable compared with the primarily "fruity" taste associated with other available "sweet and sour" sauces for use with poultry, pork, and other meat dishes.

DETAILED DESCRIPTION OF THE INVENTION

In accordance with the invention, a particular duck sauce of the invention for which poultry, pork and meat products is useful is that which comprises ingredients of water, fruits, sugar, salt, Starcit and vinegar, carmel coloring, corn syrup, vegetable stabilizer and sodium benzoate, typically marketed as Wash Yoar Sauce. Because of the "fruit" ingredients, such sauce has a taste which can generally be characterized as a mixture between "apricot" and "peach".

In formulating the mixture according to the invention, the Duck Sauce employed is then mixed in a five gallon drum along with a liter of grenadine liqueur—combining the individual ingredients of high fructose, corn sweetener, sugar cane syrup, water, citric acid, natural fruit flavors, artificial coloring and sodium benzoate, as a further preservative. Such grenadine liqueur is added slowly, into the five gallon drum, while stirring the mixture continuously for about five minutes, at room temperature, along with a large stirring spoon.

One quart of granulated garlic is then added, and stirred again into the mixture, but this time stirred "hard" for between 5-10 minutes to insure a uniform distribution of the granulated garlic throughout the mixture.

The stirring of the mixture and the adding of the respective ingredients are all done at room temperature, without any heat being added, so as to give as much a uniformity of dissolving and color as possible.

However, and in accordance with the invention, before use, the mixture is permitted to sit, and for at least 24 hours, and at a refrigerated temperature. This settling permits the garlic to dissolve into the Duck Sauce, and to uniformly distribute throughout the resulting sauce composition. Without the settling, and for this period of time, experimentation has shown that the resultant taste for the sauce is not uniform throughout, and that in certain areas of the five gallon mix, the taste might be more sweet (or more sour) than at other locations.

After such settling under refrigerated conditions (typically 38°-40° F.), the sauce of the invention can then be divided into half-pint, full pint and quart containers, and for use on poultry, pork and meat products, where desired, ready to eat. Further experimentation has shown that the uniform sweet and sour garlic taste can be extended in life by refrigeration of the remainder of the sauce not used by the consumer as a condiment for the food being eaten. In this respect, uniformity of taste throughout is of the utmost importance, and is attained by the hard stirring of the granulated garlic and its ensuing refrigeration in the finalized product in providing stability of taste throughout use.

While there has been described what is considered to be a preferred embodiment of the invention, it will be appreciated that modifications can be made by those skilled in the art without departing from the scope of the teachings herein. That is, whereas Applicant has described a particular composition for a particular Duck Sauce which has proved useful in the invention, along with a particular composition for a grenadine product, other variations of ingredients might be employed, but with the features of the invention still following, as long as the grenadine can be stirred easily into the mixture and so that the granulated garlic to be thereafter added is stirred hard into the solution to give uniformity of distribution. For at least such reason, therefore, resort should be had to the claims appended hereto for a complete understanding of the scope of the invention.

I claim:

1. A method for commercially producing bulk quantities of a sweet and sour sauce for poultry, pork and meat products comprising the steps of:
    the easy stirring of a mixture of grenadine and duck sauce for a period of approximately five minutes, to produce a first mixture;
    the hard stirring of said first mixture with granulated garlic for a period of approximately five to ten minutes, to produce a second mixture;
    settling said second mixture for a period of at least twenty four hours before use;
    wherein said first step includes stirring of said mixture of grenadine and duck sauce at room temperature;
    wherein said second step includes stirring of said first mixture with granulated garlic at room temperature; and
    wherein said third step includes settling of said second mixture at a refrigerated temperature.

2. The method of claim 1 wherein said first step includes stirring of said mixture of grenadine and duck sauce at a rate of one liter of grenadine per five gallons of duck sauce.

3. The method of claim 2 wherein said second step includes stirring of said first mixture with one quart of granulated garlic.

4. A sweet and sour sauce according to the method of claim 1.

* * * * *